(12) United States Patent
Leonard

(10) Patent No.: US 7,545,921 B2
(45) Date of Patent: **\*Jun. 9, 2009**

(54) METHOD AND SYSTEM FOR USE WITH PHONE CALLS ORIGINATING FROM A FACILITY

(75) Inventor: Rhonda Leonard, Forest Park, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/998,475

(22) Filed: Nov. 29, 2007

(65) Prior Publication Data

US 2008/0089502 A1    Apr. 17, 2008

Related U.S. Application Data

(63) Continuation of application No. 10/943,689, filed on Sep. 17, 2004, now Pat. No. 7,359,494.

(51) Int. Cl.
*H04M 17/00*    (2006.01)

(52) U.S. Cl. .................... 379/144.02; 379/68

(58) Field of Classification Search ............ 379/114.01, 379/114.03, 114.1, 114.15, 114.22, 114.21, 379/114.23, 114.13, 210.02, 67.1, 144.02
See application file for complete search history.

(56) References Cited

U.S. PATENT DOCUMENTS

| | | | |
|---|---|---|---|
| 4,757,525 A * | 7/1988 | Matthews et al. ......... 379/88.26 |
| 5,463,677 A * | 10/1995 | Bash et al. ............. 379/144.02 |
| 5,787,150 A | 7/1998 | Reiman et al. |
| 5,943,403 A | 8/1999 | Richardson, Jr. et al. |
| 5,946,386 A | 8/1999 | Rogers et al. |
| 6,404,858 B1 | 6/2002 | Farris et al. |
| 6,535,585 B1 * | 3/2003 | Hanson et al. ........... 379/88.12 |
| 6,611,583 B1 | 8/2003 | Gainsboro |
| 6,665,380 B1 | 12/2003 | Cree et al. |
| 6,668,045 B1 | 12/2003 | Mow |
| 7,158,621 B2 * | 1/2007 | Bayne ................... 379/114.13 |
| 2006/0245559 A1 * | 11/2006 | Hodge et al. ............. 379/88.19 |
| 2007/0233610 A1 * | 10/2007 | Gyllenskog et al. .......... 705/64 |

* cited by examiner

*Primary Examiner*—Olisa Anwah
(74) *Attorney, Agent, or Firm*—Brooks Kushman P.C.

(57) ABSTRACT

A call processor records a message from a facility phone for a destination phone upon a first collect call from the facility phone to the destination phone being terminated when the first collect call is rejected at the destination phone. In response to the message having been recorded, the call processor completes a second collect call to the destination phone upon the second collect call being accepted at the destination phone. The call processor delivers the message to the destination phone during the second collect call, records a response to the message from the destination phone during the second collect call after the message has been delivered, and stores the response for subsequent retrieval by a facility phone.

18 Claims, 6 Drawing Sheets

METHOD AND SYSTEM FOR USE WITH PHONE CALLS ORIGINATING FROM A FACILITY

CROSS-REFERENCE TO RELATED APPLICATIONS

This application is a continuation of U.S. application Ser. No. 10/943,689, filed Sep. 17, 2004, now U.S. Pat. No. 7,359,494.

BACKGROUND OF THE DISCLOSURE

1. Field of the Disclosure

The present disclosure relates to a system and a method for restricted telephone message delivery.

2. Background Art

Telephone calls that are made by the residents (e.g., inmates, patients, prisoners, etc.) of a facility such as a prison, jail, mental hospital, rehabilitation center, or similar facility are typically restricted or limited. When an inmate tries to complete a collect telephone call using conventional approaches and the inmate encounters a busy signal or no answer at the called telephone number, the typical recourse using conventional approaches is for the restricted facility resident to continue to attempt to complete the desired telephone call until the collect call is answered and accepted.

One example conventional approach to restricted telephone message delivery for call processing for calls made from inmate facilities is disclosed in U.S. Pat. No. 6,665,380 to Cree et al. The '380 patent discloses an inmate messaging system and method for notifying an inmate in a prison facility of messages received from a caller outside the prison facility. The caller dials into the inmate messaging system using, for example, a conventional "touch tone" telephone. The caller is prompted by the system for identifying information, which is verified against known information in a database. Identifying information can include a PIN for verifying the caller's account. During a set-up session, the system prompts the caller to record her name. The name recording is used to verify the account when the caller leaves a message for the inmate, and is also used to identify the account when the inmate retrieves the message from within the prison. The caller can specify a time with the message for returning the telephone call, or have the call placed immediately. The inmate accesses the inmate messaging system via a prison telephone. If messages are pending for inmates residing in the vicinity of the phone, the inmate is provided with an option to retrieve a list of such pending messages. To hear specific messages, the inmate enters identifying information, such as a PIN. If the PIN is successfully verified, the system informs the inmate that a return call can be made to the caller anytime, or at a time specified by the caller.

However, conventional approaches for inmate calls have a number of problems and deficiencies. In some cases, the resident (e.g., inmate) may only have a limited time to access the facility telephone and the time allowed may not be sufficient to reach a party that answers and accepts the attempted collect call. In other examples, conventional approaches such as the '380 patent fail to provide the resident a system or method to complete the desired telephone call until the collect call is answered and accepted at the called party.

Thus, there exists a need for an improved system and an improved method for handling inmate telephone calls. Such an improved system and an improved method may address some or all of the problems and deficiencies of conventional approaches identified above, and provide additional features and advantages as discussed below.

BRIEF DESCRIPTION OF THE DRAWINGS

The present disclosure is pointed out with particularity in the appended claims. However, other features of the present disclosure will become more apparent, and the present disclosure will be best understood by referring to the following detailed description in conjunction with the accompanying drawings in which:

DETAILED DESCRIPTION OF THE PREFERRED EMBODIMENT(S)

Figure 1A:
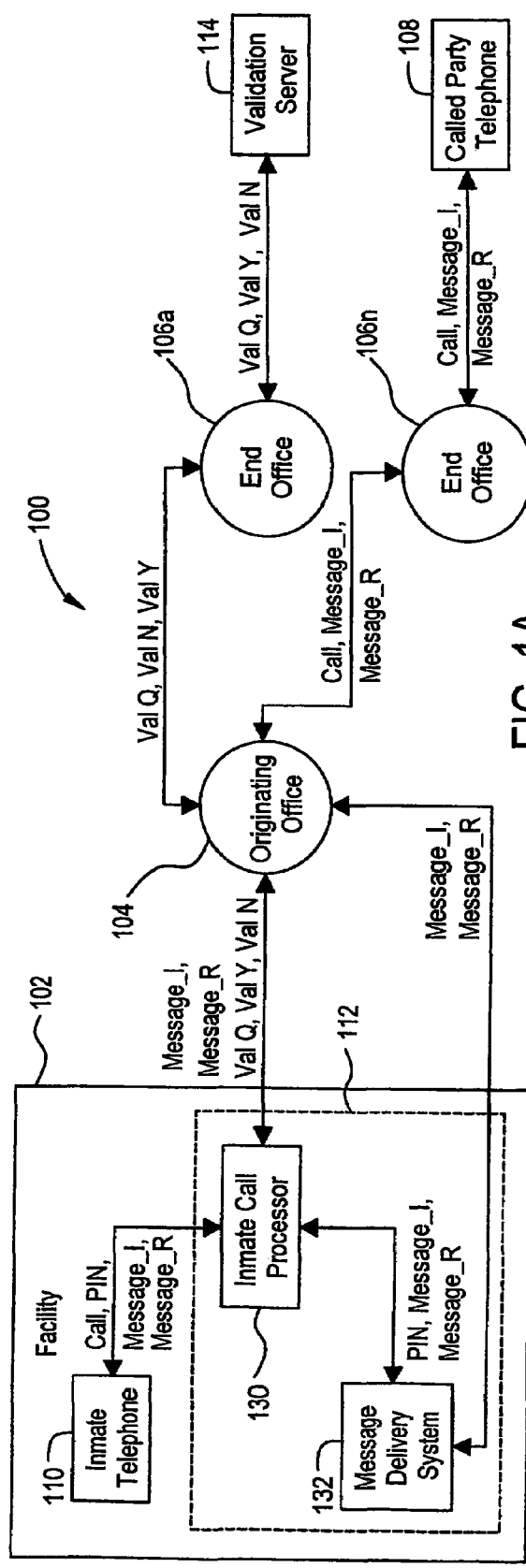
FIGS. 1(a-c) are diagrams of example implementations of a restricted call processing system of the present disclosure.

The present disclosure generally provides new, improved and innovative techniques for telephone message delivery for collect telephone calls that are made by residents (e.g., inmates) from a facility such as a correctional facility having restricted telephone usage (e.g., inmate collect calls). The present disclosure may simply and reliably provide for recording messages for a called party from the inmate for subsequent delivery as a "collect call", and may further provide for the called party to leave a recorded response for the inmate.

The present disclosure discloses an embodiment of a system having a facility phone, a call processor, and a message delivery module. The facility phone is for calling a destination phone as a first collect call. The first collect call is completed when accepted at the destination phone. The call processor is coupled to the facility phone for recording a message from the facility phone for the destination phone when the first collect call is not completed. The message delivery module is coupled to the call processor for, in response to the message having been recorded, calling the destination phone as a second collect call subsequent to the first collect call not being completed and, while the second collect call is completed upon being accepted at the destination phone, delivering the message to the destination phone during the second collect call, recording a response to the message from the destination phone during the second collect call after the message has been delivered, and storing the response for subsequent retrieval by the facility phone.

The present disclosure discloses an embodiment of a method which includes, upon a first collect call from a facility phone to a destination phone being terminated when the first collect call is rejected at the destination phone, recording by a call processor a message from the facility phone for the destination phone. In response to the message having been recorded, a second collect call is completed from the call processor to the destination phone upon the second collect call being accepted at the destination phone. The message is delivered from the call processor to the destination phone during the second collect call. A response to the message from the destination phone is recorded by the call processor during the second collect call after the message has been delivered. The call processor stores the response for subsequent retrieval by a facility phone.

The present disclosure discloses an embodiment of a system having a call processor and a message delivery module. The call processor is operable for enabling collect calls from facility phones to destination phones when the collect calls are accepted at the destination phones, terminating the collect calls when the collect calls are rejected at the destination phones, and recording messages from the facility phones for the destination phones. The message delivery module is coupled to the call processor to be operable for automatically calling the destination phones as collect calls, delivering the messages to the destination phones and recording responses to the messages when the collect calls are accepted at the destination phones, and storing the responses for subsequent retrieval by the facility phones. In operation, the call processor records a message from a facility phone for a destination phone in response to a first collect call from the facility phone to the destination phone being terminated. The message delivery module automatically calls the destination phone as a second collect call in response to the message having been recorded. Upon the second collect call being accepted at the destination phone, the message delivery module delivers the message to the destination phone during the second collect call, records a response to the message from the destination phone during the second collect call after the message has been delivered, and stores the response for subsequent retrieval by a facility phone.

The above features, and other features and advantages of the present disclosure are readily apparent from the following detailed descriptions thereof when taken in connection with the accompanying drawings.

With reference to the Figures, preferred embodiments of the present disclosure will now be described in detail. The present disclosure is generally implemented in connection with a correctional facility, prison, jail, forensic care center, mental hospital, rehabilitation center, drug rehabilitation center, or similar facility where the telephone calls that are made by the residents of the facility (e.g., inmates, patients, prisoners, etc.) are restricted or limited. Generally, the present disclosure provides an improved system and an improved method for telephone call processing related to telephone calls from a restricted facility (e.g., inmate calls).

The present disclosure may simply and reliably provide inmates a system and method for making collect telephone calls and obtaining responses to the calls. The calls from residents at such facilities are generally routed from an inmate telephone through a call processor (e.g., call processing platform, inmate call processor, etc.) to an originating central office, from the originating central office through an end user central office, and from the end user central office to an end user (i.e., destination, called party, recipient, etc.) telephone. The present disclosure generally provides an improved system and method for controlling telephone calls and telephone message and response deliveries to and from institutions where telephone calls are restricted.

In contrast, conventional approaches typically are limited in the flexibility provided to the resident of the facility and the parties at destination telephones. Such conventional approaches can fail to provide adequate protection of the parties at destination telephones from harassment while still providing inmates access to telephone service external to the facility.

While the present disclosure is described in connection with an inmate telephone call system (e.g., a system as may be implemented in connection with a jail or prison), the present disclosure may be advantageously implemented in connection with any institution or facility where controlling (e.g., disabling, restricting, limiting, and the like) telephone calls made using the facility telephone system is desired. Such facilities may include mental health care facilities (e.g., mental hospitals, so-called half-way houses, etc.), forensic care centers, correctional facilities or institutions, drug rehabilitation centers, a variety of clinics, and the like.

Referring to FIG. 1a, a diagram illustrating a telephone call delivery system 100 of the present disclosure is shown. System 100 is generally implemented as an institutional call system. System 100 is generally implemented as a telephone call system in connection with a prison, jail, or similar facility (i.e., an institution) 102 where the telephone calls and messages and responses to and from the facility that are made by the residents (e.g., inmates, patients, etc.) of the facility (and parties that receive the calls and messages) are to be controlled (e.g., restricted, limited, etc.). Such restrictions and limitations are generally intended to reduce or prevent harassment of third parties, and fraudulent telephone calls that are made by the residents (e.g., prison inmates) and charged back to a destination phone.

As discussed above, the residents conventionally are limited to making repeated attempts at placing collect telephone calls when the destination telephone number is busy or the call attempt is unanswered. The description below generally refers to residents of facility 102 as inmates and the telephone calls placed or attempted by the residents as inmate calls, however, the residents of facility 102 may have any appropriate status.

System 100 generally comprises an institution 102, an originating central office (e.g., a first switching office) 104, at least one end (e.g., receiving, destination, etc.) central (e.g., a second switching office) office 106 (e.g., end offices 106a-106n), and at least one end user (destination) telephone 108. Those of ordinary skill in the art will appreciate that originating office 104 and receiving office 106 may be, in one example, one office, and in another example multiple offices.

Institution 102 generally comprises at least one resident (e.g., a facility resident such as an inmate, patient, etc.) telephone 110 (more generally a number of telephones 110a-110n, not shown for clarity of explanation), an inmate facility (or any other restricted facility) message processing and delivery system (or processor) 112. A validation server 114 is generally electrically coupled to at least one end office 106 (e.g., the end office 106a). Telephone 110, message processor 112, originating central office 104, an end office 106 (e.g., the end office 106n), and end user telephone 108 are electrically serially coupled such that a telephone call and messages that originate at resident telephone 110 (e.g., CALL) may be sent (i.e., routed, presented, transmitted, transferred, etc.) to end user telephone 108 via system 112, originating central office 104, and end office 106. Similarly, message signals (i.e., messages, MESSAGE_I) that are generated by the inmate placing the call from telephone 110, and response message signals (i.e., messages, MESSAGE_R) that are generated by an end user of telephone 108 may also be presented and received to and from telephones 110 and 108 via facility call processor 112, originating central office 104, and end office 106.

Messaging system 112 is generally electrically coupled to validation server 114 via originating office 104 and end office 106a. Message system 112 may present a validation query (e.g., VALQ) to server 114. When a call (i.e., CALL) from institution 102 is billable (i.e., valid), server 114 may present a signal (e.g., VALY) to system 112 to indicate that the call is valid. When a call from institution 102 is not billable (i.e., invalid), server 114 may present a signal (e.g., VALN) to system 112 to indicate that the call is not valid.

Figure 2:
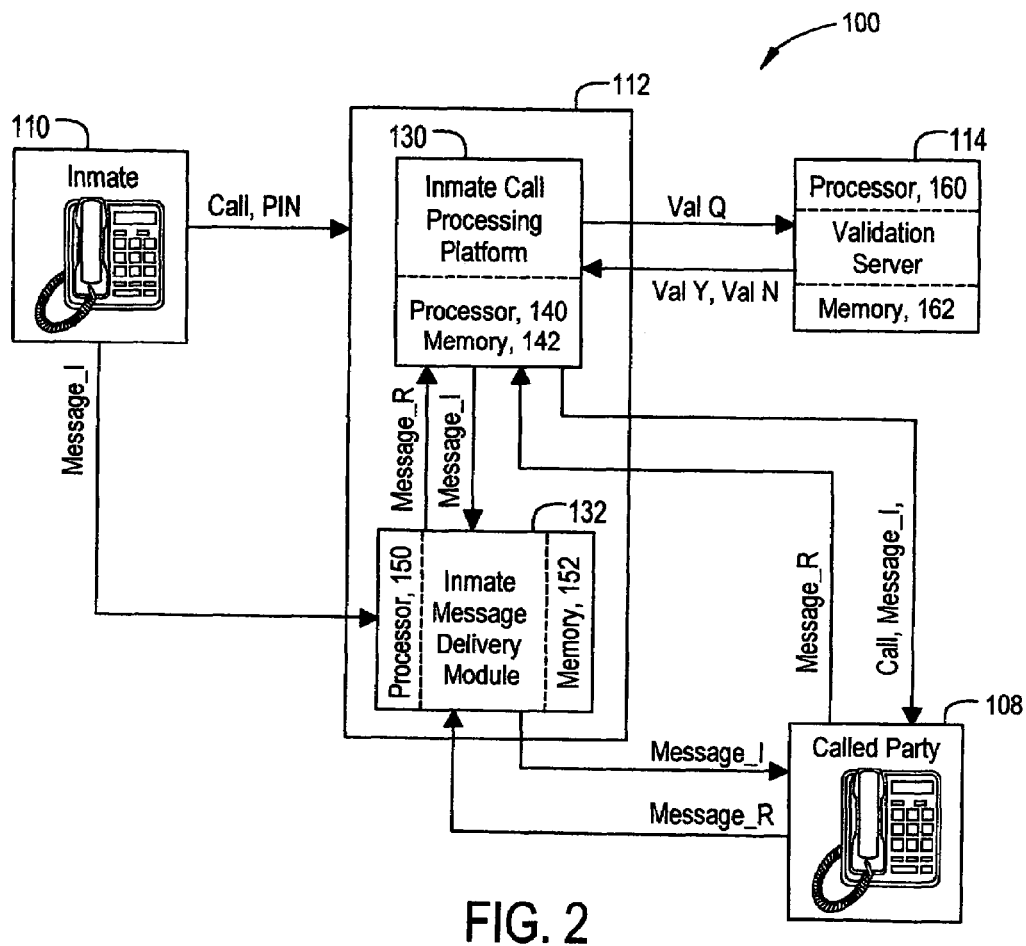
FIG. 2 is a detailed diagram of the restricted call processing system of the present disclosure.

Facility call processor 112 may include a memory (shown in FIG. 2). The memory may be configured to store (e.g., hold, contain, etc.) telephone messages (e.g., the MESSAGE_I), responses to messages (e.g., the MESSAGE_R), Personal Identification Number (PIN) information, records of call attempts, billing information, and the like using a line information database (LIDB), cached information, a look up table (LUT), etc.

Figure 1B:
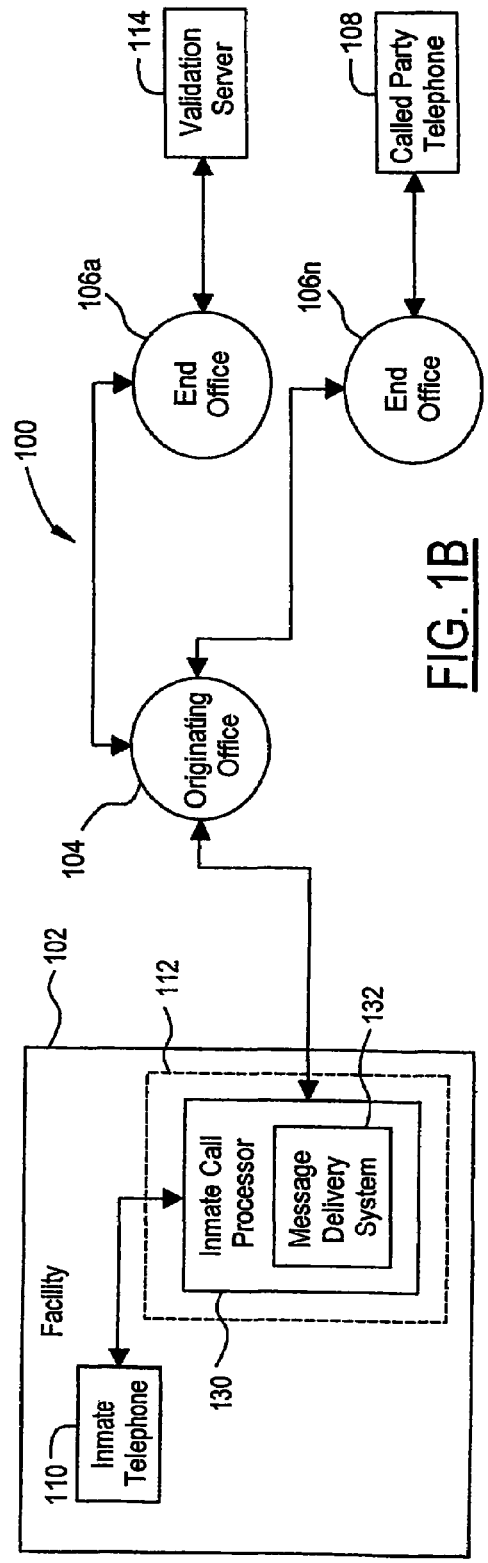

Referring to FIG. 1*b*, a diagram illustrating an alternative embodiment of system 100 is shown. Message delivery system 132 may be implemented in connection with inmate call processor 130.

Figure 1C:
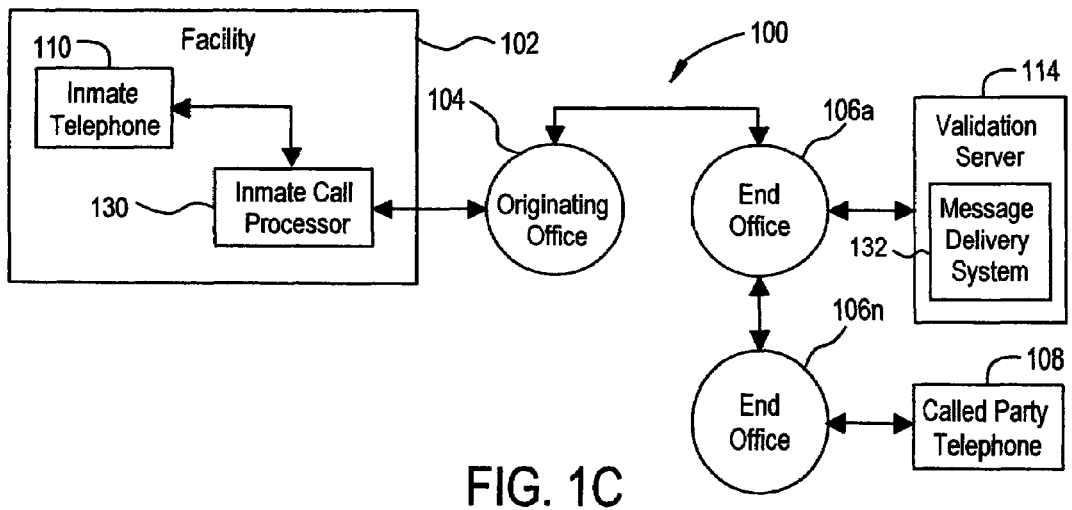

Referring to FIG. 1*c*, a diagram illustrating another alternative embodiment of system 100 is shown. Call/message processing system 112 may be distributed in system 100. Message delivery system 132 may be implemented in connection with validation server 114. As is understood by one skilled in the art, other appropriate configurations for system 100 may be implemented to meet the design criteria of a particular application.

Referring to FIG. 2, a detailed diagram illustrating restricted call processing system 100 of the present disclosure is shown. In one example, message processing and delivery system 112 generally comprises an inmate (or other restricted usage party) call processing platform 130 and an inmate message delivery module 132. Platform 130 generally comprises underlying hardware or software for a system (e.g., call processing). Call processing platform 130 and message delivery module 132 generally comprise at least one processor (or controller, e.g., processor 140 in platform 130 and processor 150 in module 132) and at least one computer-readable storage media (i.e., memory, e.g., memory 142 in platform 130 and memory 152 in module 132) that is configured to generally provide short-term and long-term storage of data (e.g., at least one lookup table, LUT, at least one operation control routine, etc.) used by call processing platform 130 and message delivery module 132. Server 114 generally comprises a processor 160 and at least one computer-readable storage media (i.e., memory) 162.

The computer-readable storage media may be implemented by any of a number of known physical devices capable of storing data representing instructions executable by the controller. Such devices may include PROM, EPROM, EEPROM, flash memory, and the like in addition to various magnetic, optical, and combination media capable of temporary and/or permanent data storage. The computer-readable storage media may include data representing program instructions (e.g., software), calibrations, routines, steps, methods, blocks, operations, operating variables, and the like used in connection with associated hardware to control the various systems and subsystems, and modes of operation (e.g., call and message processing) of system 100. Platform 130 and module 132 generally comprise at least one of software, hardware, firmware, and a combination thereof.

While call processing platform 130 and message delivery module 132 are illustrated in connection with processing and delivery system 112 in facility 102 for clarity of explanation, one of ordinary skill in the art would understand that in other examples, call processing platform 130 and message delivery module 132 may be implemented in connection with at least one of originating office 104, end office 106 and server 114, or other appropriate processing system (not shown) to meet the design criteria of a particular application.

Call processing platform 130 is generally electrically coupled to receiving telephone 108, restricted telephone 110, validation server 114, and message delivery module 132. Message delivery module 132 is generally electrically coupled to receiving telephone 108, restricted telephone 110, and call processing platform 130.

Message processing may be generally implemented by performing one or more of the following steps (described in further detail in connection with FIGS. 3(*a-b*)).

In one example process of the present disclosure, a facility resident (e.g., inmate) may attempt to make a telephone call (e.g., present the signal CALL) from a facility telephone 110 to a called party billing telephone number (BTN) (i.e., a BTN that corresponds to a respective end user or destination phone 108).

Call processing platform 112 generally checks for site blocks to the BTN (i.e., determines whether to proceed with processing the telephone call attempt to the BTN). When a site block has been implemented from the originating facility or respective originating telephone number to the BTN, an alert signal may be generated.

Call processing platform 112 generally validates the call as collect billable (e.g., at least one of a line information database (LIDB), cached information, and the like may be examined to determine whether the call is collect billable, i.e., the billable status).

When the call is not accepted for any reason (e.g., the destination telephone number, (i.e., the BTN) is busy, unanswered, rejected by the destination user, etc.), the inmate is generally prompted to send a voice message.

When the "Called Party Response" (CPR) feature is enabled, and the inmate is using the CPR feature for the first time, the inmate is generally prompted to establish a respective voice mail personal identification number (PIN). The name of the inmate is generally recorded (e.g., saved in the memory) in connection with the PIN for present and future use.

When the "Called Party Response" feature is enabled and the inmate has previously used the CPR feature (i.e., the inmate has an established PIN), the inmate is generally prompted to enter the respective voice mail PIN.

Message delivery module 132 generally performs a predetermined number (typically a multiple number) of attempts to deliver the message MESSAGE_I to respective telephone 108.

The inmate is generally prompted to record a message (e.g., the signal MESSAGE_I).

A completed call record may be generated (or created) and processed by call processing platform 130 for billing the called party (i.e., the user associated with the respective telephone 108).

In another, i.e., optional or alternative, example process of the present disclosure, the inmate may call directly into the voicemail system 100, enter the respective PIN, and record and send (e.g., transmit, present, etc.) the message (e.g., MESSAGE_I) without attempting to make a telephone call (e.g., CALL).

Message delivery may be implemented by performing one or more of the following steps.

Call processing platform 130 may attempt to deliver the inmate message MESSAGE_I to the BTN (i.e., respective end user telephone set 108).

When the BTN at telephone 108 answers, the name of the inmate who placed the MESSAGE_I and the name of facility 102 are generally played (reproduced) in the greeting portion of the MESSAGE_I. The called party at telephone 108 is generally provided a cost quote for receipt of the body of the message MESSAGE_I, and the called party is requested to indicate acceptance of the message and the respective cost as an account charge.

When called party at telephone 108 accepts the MESSAGE_I and the respective charge, the message MESSAGE_I is played (reproduced). When the CPR feature is enabled, the called party at telephone 108 is generally offered the opportunity to leave (i.e., record) a response message (e.g., MESSAGE_R) for the inmate who left the message MESSAGE_I. The called party at telephone 108 is generally provided the opportunity to hear (i.e., play, reproduce, listen to, etc.) the message MESSAGE_I a plurality (generally a predetermined number) of times.

Response and status retrieval may be implemented by performing one or more of the following steps.

In one example, when the inmate attempts to make a subsequent telephone call to a previously called BTN related to a telephone 108, the inmate may be provided the opportunity to listen to (e.g., play, hear, etc.) the status of messages MESSAGE_I that the inmate has previously left for delivery to telephone 108. In another example, the inmate may call into inmate message delivery system 100 to obtain the status of a message MESSAGE_R that has been left for delivery to the inmate by the user of the BTN at destination telephone 108.

When the inmate has left a message MESSAGE_I in system 100 (e.g., a message signal MESSAGE_I is stored in message delivery module 132 for the destination 108 user), and the end user of telephone 108 has generated and stored a respective response message MESSAGE_R, the inmate may perform at least one of listening to, replaying, saving and deleting the response MESSAGE_R.

Billing related to the inmate message delivery system 100 may be implemented by performing one or more of the following steps.

A call record for billing purposes may be generated for each message generated and a call record for billing purposes may be generated for each call generated/accepted by an inmate/end user (e.g., each message MESSAGE_I) and each response message MESSAGE_R that is generated by the end user (recipient) at destination 108. The call record is generally sent to a call processing system (not shown) where a call data record (CDR) and appropriate billing may be generated and sent to the appropriate entity (generally at least one of the inmate, the end user, and the administration of the facility where the inmate is a resident) for payment.

Figure 3A:
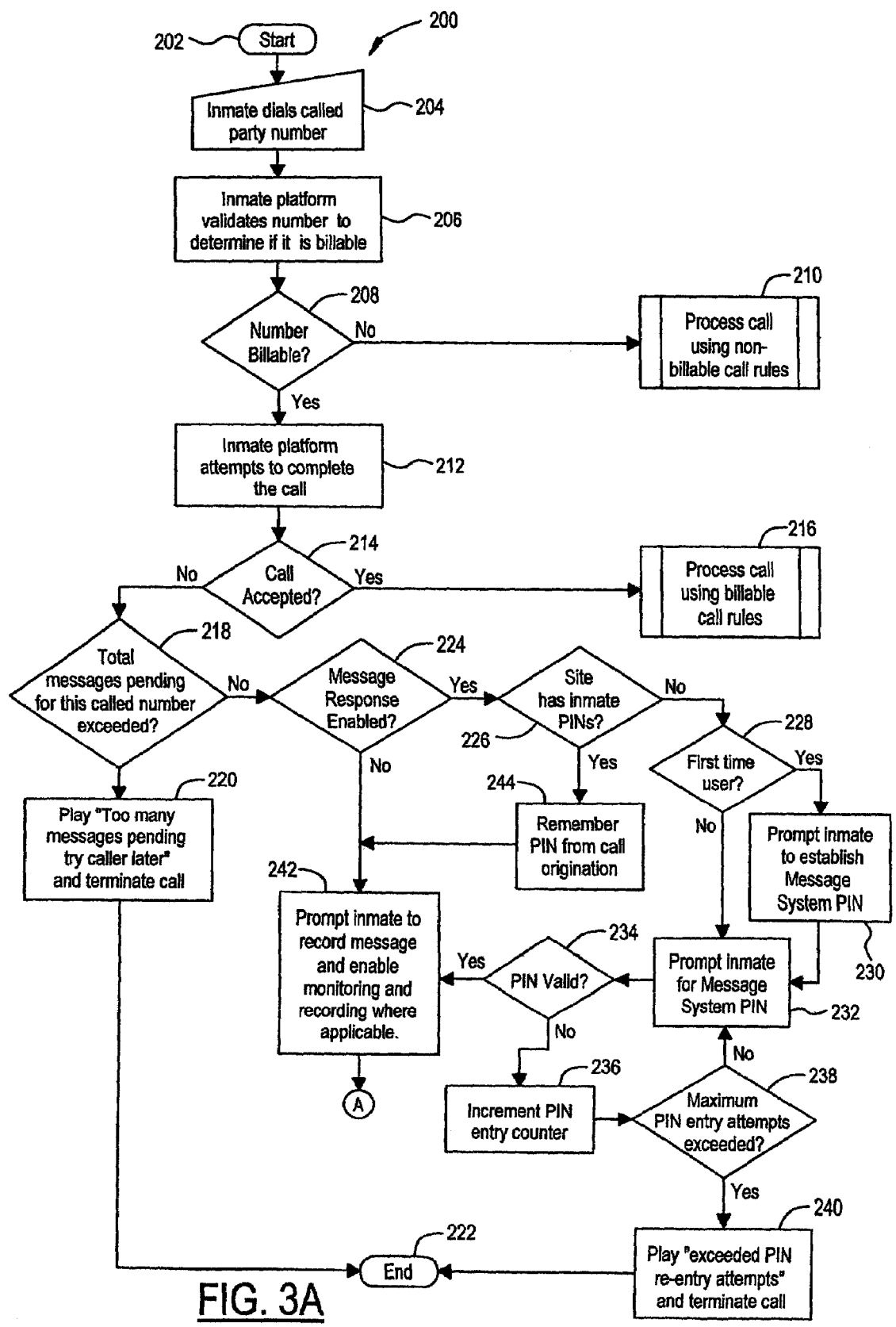
FIG. 3 is a flow diagram of a message delivery and response process of the present disclosure.
Figure 3B:
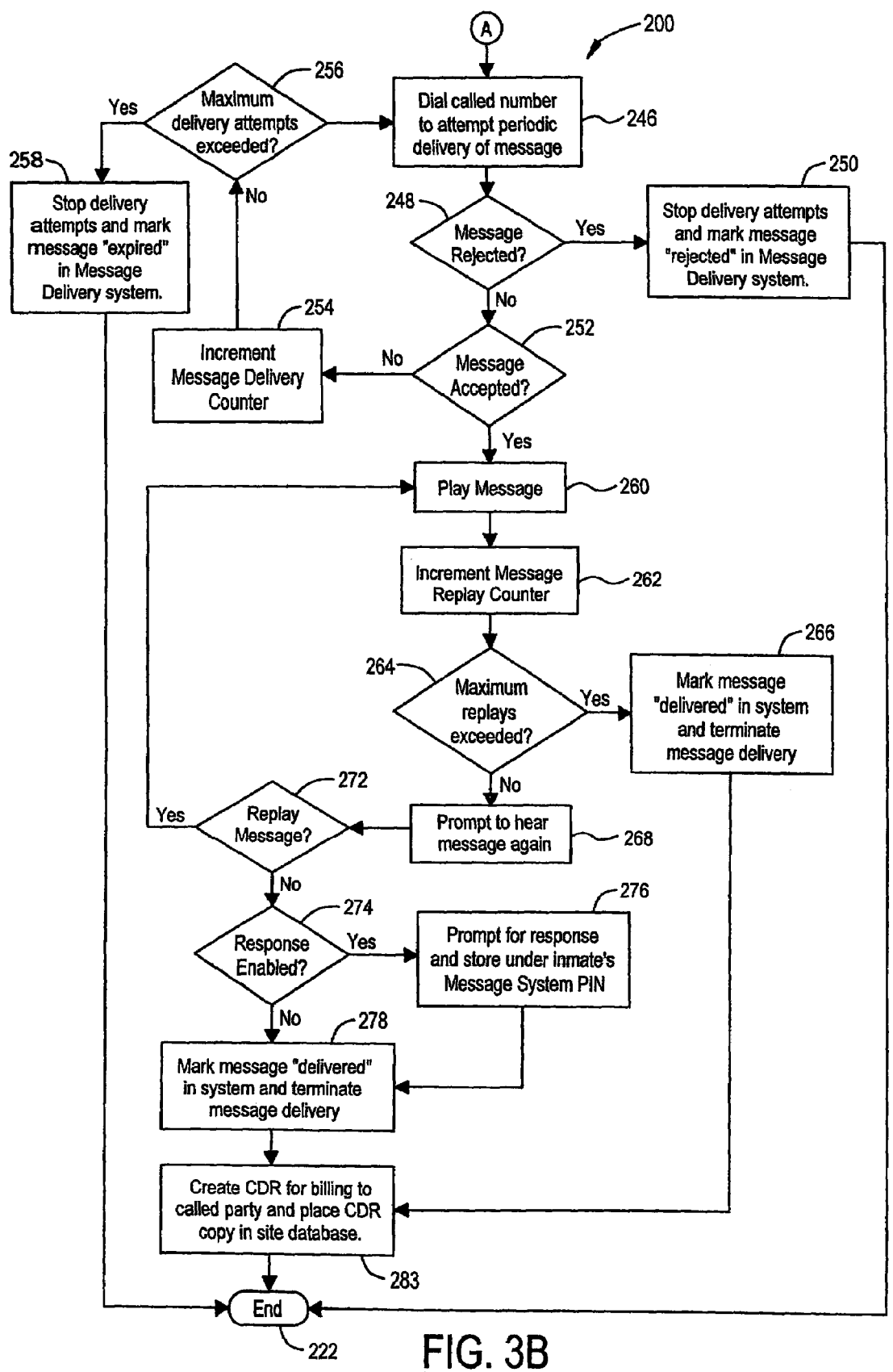

Referring to FIG. 3 (having parts A and B), a flow diagram illustrating a process (i.e., method, steps, blocks, routines, operations, module, etc.) 200 of the present disclosure is shown. Process 200 is generally implemented as a message delivery and response module and may be implemented in connection with call processing system 100 of the present disclosure.

Process 200 starts (block or step 202) and the inmate dials a called party number (e.g., the inmate in facility 102 calls a number corresponding to a telephone 108 using a telephone 110) (block or step 204). The inmate facility platform (e.g., inmate call processing platform 130 in connection with validation server 114) validates the called number to determine whether the called number is billable (block or step 206 and decision block or step 208).

When the called number is not billable (i.e., NO leg of decision block 208), process 200 generally processes the telephone call (e.g., the signal CALL) using non-billable rules (block or step 210, not shown in detail). Returning to decision block 208, when the called number is billable (i.e., YES leg of the decision block 208), process 200 (e.g., generally message processing and delivery system 112, and more particularly, inmate call processing platform 130 in connection with inmate message delivery module 132) attempts to complete the call (block or step 212).

When the call is billable, process 200 generally determines whether the call is accepted (decision block or step 214). When the called number is accepted (i.e., YES leg of the decision block 214), process 200 generally processes the telephone call (e.g., the signal CALL) using billable call rules (block or step 216, not shown in detail). Returning to decision block 214, when the called number is not accepted (i.e., NO leg of decision block 214), process 200 generally determines whether the total number of messages pending for the called telephone number exceeds a predetermined value (or amount) (decision block or step 218).

When the total number of messages pending for the called telephone number exceeds the predetermined value (i.e., YES leg of decision block 218), process 200 generally plays a message indicating that the total number of messages pending for the called telephone number exceeds the predetermined value (e.g., "Too many messages are pending, try call later.") and the call may be terminated (block or step 220). Process 200 may end (block or step 222).

Returning to decision block 218, when the total number of messages pending for the called telephone number does not exceed the predetermined value (i.e., NO leg of decision block 218), process 200 generally determines whether a message response operation is enabled (e.g., made operational via message processing and delivery system 112) (decision block or step 224). When a message response operation is enabled (i.e., YES leg of decision block 224), process 200 generally determines whether the site (e.g., facility 102) has at least one personal identification number (PIN) for the inmate (decision block or step 226).

When the site does not have at least one PIN for the inmate and does not use an inmate PIN system for normal calling processing (i.e., NO leg of decision block 226), process 200 generally determines whether the inmate is a first time user (decision block or step 228). When the inmate is a first time user (i.e., YES leg of decision block 228), process 200 generally prompts the inmate to establish at least one PIN (block or step 230). Process 200 generally prompts the inmate to enter at least one PIN (block or step 232).

Returning to decision block 228, when the inmate is not a first time user (i.e., NO leg of decision block 228), process 200 generally transitions to block 232. From block 232 process 200 generally determines whether the PIN is valid (decision block or step 234). When the PIN is not valid (i.e., NO leg of decision block 234), process 200 may increment a PIN entry counter (not shown) (block or step 236). Process 200 may determine whether a predetermined number of PIN attempts (e.g., a maximum number) has been exceeded (decision block or step 238).

When a predetermined number of PIN attempts has been exceeded (i.e., YES leg of decision block 238), process 200 generally plays a message indicating that the predetermined number of PIN attempts has been exceeded (e.g., "You have exceed PIN re-entry attempts.") (block or step 240), and process 200 may end (the block or step 222). Returning to decision block 238, when the predetermined number of PIN attempts has not been exceeded (i.e., NO leg of decision block 238), process 200 generally transitions to the block 232.

Returning to decision block 234, when process 200 determines the PIN is valid (i.e., YES leg of decision block 234), process 200 generally prompts the inmate, in one example, for his/her name (or, in another example, optionally/alternatively, the name of the inmate may be passed from inmate call processing system 112) and to record a message (e.g., MESSAGE_I), and, where applicable, enable monitoring and recording operations (not shown) (block or step 242). Returning to decision block 226, when process 200 determines that the site has at least one PIN for the inmate (i.e., YES leg of decision block 226), process 200 generally recalls the PIN from a call origination memory (not shown) (block or step 244), and process 200 generally transitions to block 242.

Returning to decision block 224, when process 200 determines that the message response process is not enabled (i.e., NO leg of decision block 224), process 200 generally transitions to block 242. From block 242, process 200 generally dials the called number to attempt periodic delivery of message MESSAGE_I for a predetermined number of times over a predetermined time interval (block or step 246). Process 200 generally determines whether a message (e.g., MESSAGE_I) is rejected (decision block or step 248).

When a message is rejected (i.e., YES leg of decision block 248), process 200 generally stops message delivery attempts and marks the message as "rejected" in message delivery system 112 memory (block or step 250), and process 200 may end (block or step 222). Returning to decision block 248, when the message is not rejected (i.e., NO leg of decision block 248), process 200 may determine whether message MESSAGE_I has been accepted (decision block or step 252).

When the message is not accepted (i.e., NO leg of the decision block 252), process 200 generally increments a message delivery counter (not shown) (block or step 254), and determines whether a predetermined number (e.g., a maximum number) of message delivery attempts has been exceeded (decision block or step 256). When the predetermined number of message delivery attempts has been exceeded (i.e., YES leg of decision block 256), process 200 may stop delivery attempts, mark message MESSAGE_I as "expired" in message delivery system 112 memory (block or step 258), and process 200 may end (the block or step 222). Returning to decision block 256, when the predetermined number of message delivery attempts has not been exceeded (i.e., NO leg of decision block 256), process 200 may return to block 246.

Returning to decision block 252, when message MESSAGE_I is accepted (i.e., the user at respective telephone 108 decides to listen to message MESSAGE_I, YES leg of decision block 252), process 200 generally plays back message MESSAGE_I (block or step 260), increments a message replay counter (not shown, block or step 262), and determines whether a predetermined number (i.e., a maximum number) of replays of the message has been exceeded (decision block or step 264).

When the predetermined number of replays of the message has been exceeded (i.e., YES leg of decision block 264), process 200 generally marks message MESSAGE_I as "delivered" in message delivery system 112 memory (block or step 266), process 200 may generate (or create) a call data record (CDR) for billing to the party that corresponds to the telephone number associated with telephone 108 in a database (not shown) in message delivery system 112 and process 200 may end (block or step 222).

Returning to decision block 264, when the predetermined number of replays of the message has not been exceeded (i.e., NO leg of decision block 264), process 200 generally prompts the listener (e.g., the party that corresponds to the telephone number associated with telephone 108) to hear message MESSAGE_I again (block or step 270), and process 200 may determine whether the message is to be replayed (decision block or step 272).

When the listener desires to hear the message again (i.e., YES leg of decision block 272), process 200 generally returns to block 260. Returning to decision block 272, when the listener does not want to hear the message again (i.e., NO leg of decision block 272), process 200 generally determines whether a response message process is enabled in the system where method 200 is implemented (decision block or step 274).

When a message response/message process is enabled in the system (i.e., YES leg of decision block 274), process 200 may generate a prompt for a message and the listener at telephone 108 may generate (i.e., record) a message (e.g., message MESSAGE_R) and message MESSAGE_R may be stored in message delivery system 112 memory for access via the inmate PIN (block or step 276). Process 200 generally marks message MESSAGE_I as "delivered" in message delivery system 112 memory and terminates delivery of message MESSAGE_I (block or step 278). Process 200 generally transitions to block 268.

Returning to decision block 274, when a response message process is not enabled in the system (i.e., NO leg of decision block 274), process 200 may transition to block 278.

Figure 4:
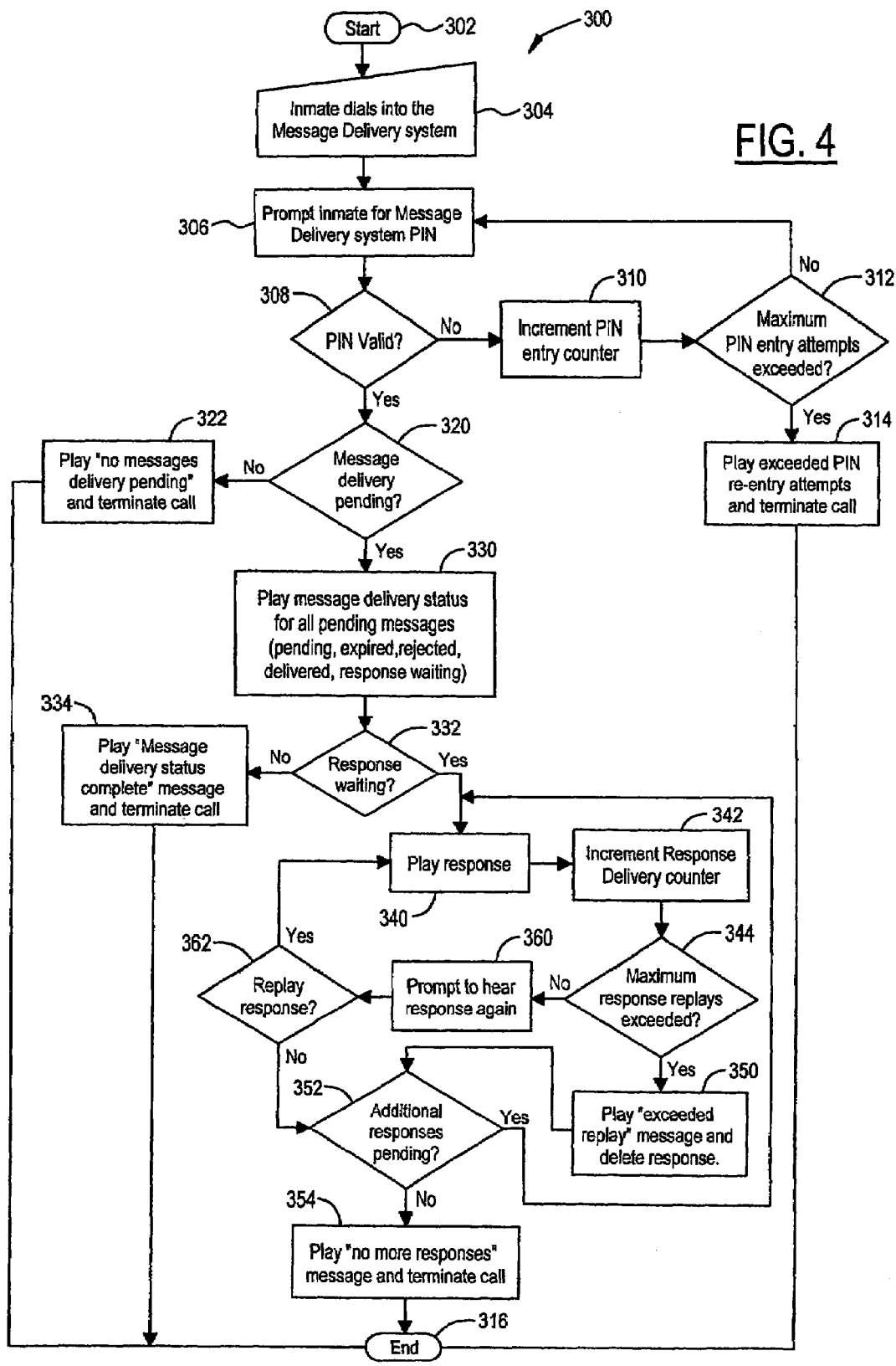
FIG. 4 is a flow diagram of a message response retrieval process of the present disclosure.

Referring to FIG. 4, a flow diagram illustrating a process (i.e., method, steps, blocks, routines, operations, module, etc.) 300 of the present disclosure is shown. Process 300 is generally implemented as a message delivery retrieval module and may be implemented in connection with call processing system 100 and message delivery and response module 200 of the present disclosure.

Process 300 starts (block or step 302) and, in one example, the inmate dials into message delivery system 112 (e.g., the inmate in facility 102 calls a number corresponding to message delivery module 132 using a telephone 110) (or, in another example, optionally/alternatively, when the inmate attempts to dial a phone number for which a message is pending, the system where process 300 is implemented generally prompts the inmate to enter a message delivery response retrieval module such as module 132) (block or step 304). Process 300 may prompt the inmate for a PIN to permit access to message delivery system 112 (block or step 306), and method 300 may determine whether the PIN is valid (decision block or step 308).

When the PIN is not valid (i.e., NO leg of decision block 308), process 300 may increment the PIN entry counter (block or step 310), and determine whether a predetermined number (e.g., a maximum) of PIN attempts has been exceeded (decision block or step 312). When the predetermined number of PIN attempts has been not exceeded (i.e., NO leg of decision block 312), process 300 generally returns to block 306.

When the predetermined number of PIN attempts has been exceeded (i.e., YES leg of decision block 312), process 300 generally plays the message indicating that the predetermined number of PIN attempts has been exceeded (e.g., "You have exceed PIN re-entry attempts.") and the call may be terminated (block or step 314), and process 300 may end (block or step 316). Returning to decision block 308, when the entered PIN is valid (i.e., YES leg of decision block 308), method 300 generally determines whether a message MESSAGE_I is pending for delivery (decision block or step 320).

When there is no message pending for delivery to/from the inmate (i.e., NO leg of decision block 320), message delivery system 112 may play a message indicating that there is no message pending for delivery to/from the inmate (e.g., "No messages pending delivery.") (block or step 322), and method 300 may end (block 316). Returning to decision block 320, when there is at least one message pending for delivery to the inmate (i.e., YES leg of decision block 320), message delivery system 112 may play a message indicating delivery status for all pending messages (e.g., pending, expired, rejected, delivered, and response waiting) (block or step 330), and method 300 may determine whether at least one response (e.g., a message MESSAGE_R) is waiting (decision block or step 332).

When there is no response (i.e., message MESSAGE_R) waiting for delivery to the inmate (i.e., NO leg of the decision block 320), message delivery system 112 may play a message indicating that there is no response message pending for delivery to the inmate (e.g., "Message delivery status complete.") (block or step 334), and method 300 may end (block 316). Returning to decision block 332, when there is at least one message response (i.e., message MESSAGE_R) waiting for delivery to the inmate (i.e., YES leg of the decision block 332), process 300 may play the response to the inmate (block or step 340), increment a response deliver counter (not shown) (block or step 342), and determine whether a predetermined number (e.g., a maximum number) of response message replays has been exceeded (decision block or step 344).

When the predetermined number of response message replays has been exceeded (i.e., YES leg of decision block 344), message delivery system 112 may play a message indicating that response message replay has been exceeded (e.g., "Replay exceeded.") (block or step 350), and method 300 may determine whether additional response messages MESSAGE_R are pending (decision block or step 352). When no additional response messages MESSAGE_R are pending (i.e., NO leg of decision block 352), process 300 generally plays a message indicating no additional response messages MESSAGE_R are pending (e.g., "There are no more response messages."), terminates the call, and process 300 may end (block 316).

Returning to decision block 352, when additional response messages MESSAGE_R are pending (i.e., YES leg of decision block 352), process 300 generally returns to block 340. Returning to decision block 344, when the predetermined number of response message replays has not been exceeded (i.e., the NO leg of decision block 344), message delivery system 112 may prompt the inmate to hear response message MESSAGE_R again (block or step 360) and determine whether response message MESSAGE_R is to be replayed (decision block or step 362).

When response message MESSAGE_R is to be replayed (i.e., YES leg of decision block or step 362), process 300 generally returns to block 340. Returning to decision block 362, when response message MESSAGE_R is not to be replayed (i.e., NO leg of decision block or step 362), process 300 generally returns to block 352.

Figure 5:
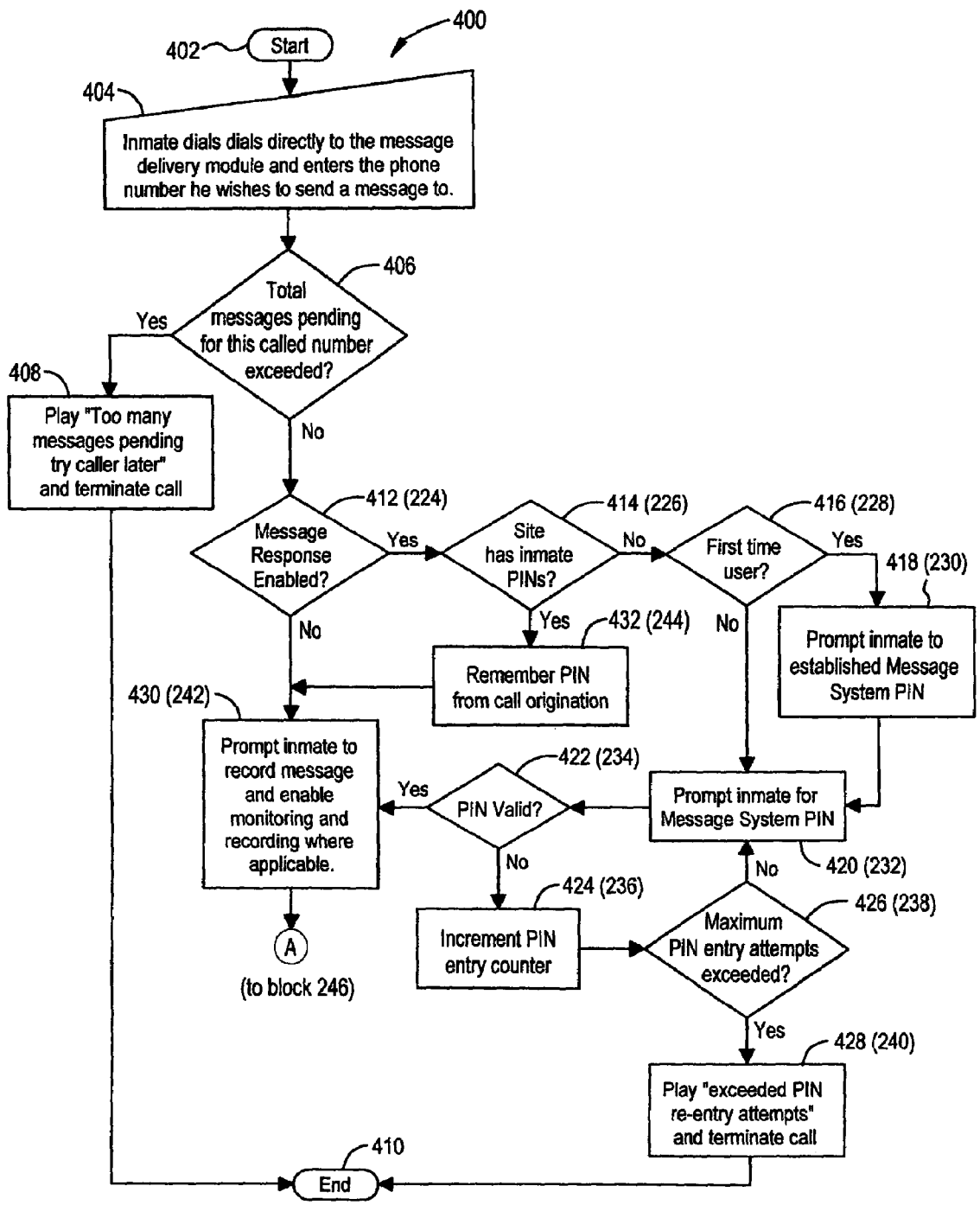
FIG. 5 is a flow diagram of another message delivery and response process of the present disclosure.

Referring to FIG. 5, a flow diagram illustrating a process (i.e., method, steps, blocks, routines, operations, module, etc.) 400 of the present disclosure is shown. Process 400 is generally implemented as a message generation module and may be implemented in connection with call processing system 100 and message delivery and response modules 200 and 300 of the present disclosure.

Process 400 starts (block or step 402) and the inmate dials directly into message delivery system 112 (e.g., the inmate in facility 102 calls a number corresponding to message module 132 using a telephone 110) and the inmate enters a phone number associated with the destination party where a message is to be delivered without attempting to place a collect call (block or step 404).

Process 400 may determine whether a predetermined (i.e., a total) number of messages pending for the called destination number has been exceeded (block or step 406). When the predetermined number of messages pending has been exceeded (i.e., YES leg of decision block 406), message delivery system 112 may play a message indicating that the predetermined number of messages pending has been exceeded (e.g., "Too many messages pending—try call later.") and the call may be terminated (block or step 408). Process 400 may end (block or step 410).

Returning to decision block 406, when the predetermined number of messages pending has been not exceeded (i.e., NO leg of decision block 406), message delivery system 112 may determine whether a message response process has been enabled (decision block or step 412). Block 412 may be implemented similarly to block 224 of process (method) 200. Similarly, blocks (or steps) 414-432 may be implemented similarly to blocks 226-244 of process 200.

As is readily apparent from the foregoing description, then, the present disclosure generally provides an improved system and method for controlling telephone calls and telephone message and response deliveries to and from institutions where telephone calls are restricted.

While embodiments of the present disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

What is claimed is:

1. A system comprising:
a facility phone for calling a destination phone as a first collect call, wherein the first collect call is completed when accepted at the destination phone;
a call processor coupled to the facility phone for recording a message from the facility phone for the destination phone when the first collect call is not completed; and
a message delivery module coupled to the call processor for, in response to the message having been recorded, calling the destination phone as a second collect call subsequent to the first collect call not being completed and, while the second collect call is completed upon being accepted at the destination phone, delivering the message to the destination phone during the second collect call, recording a response to the message from the destination phone during the second collect call after the message has been delivered, and storing the response for subsequent retrieval by the facility phone.

2. The system of claim 1 wherein:
the call processor prompts the facility phone to enter a PIN in order to record the message from the facility phone.

3. The system of claim 2 wherein:
the message delivery module retrieves the stored response in response to the entry of the PIN.

4. The system of claim 1 wherein:
the call processor generates a completed call record for billing a party associated with the destination phone.

5. The system of claim 1 wherein:
the message delivery module retrieves the stored response using the facility phone through the call processor.

6. The system of claim 1 wherein:
the stored message is retrieved more than one time.

7. The system of claim 1 wherein:
the call processor is operable to record a message from the facility phone for the destination phone irrespective of the whether the facility phone calls the destination phone as the first collect call.

8. The system of claim 1 wherein:

the facility phone is a phone of one of a jail, a prison, a drug rehabilitation center, a correctional facility, and a mental hospital 9. A method comprising:

upon a first collect call from a facility phone to a destination phone being terminated when the first collect call is rejected at the destination phone, recording by a call processor a message from the facility phone for the destination phone;

in response to the message having been recorded, completing a second collect call from the call processor to the destination phone upon the second collect call being accepted at the destination phone;

delivering the message from the call processor to the destination phone during the second collect call;

recording by the call processor a response to the message from the destination phone during the second collect call after the message has been delivered; and storing by the call processor the response for subsequent retrieval by a facility phone.

10. The method of claim 9 wherein:

recording the message further comprises prompting for the entry of a PIN into the facility phone.

11. The method of claim 9 further comprising:

retrieving from the call processor the stored response for a facility phone.

12. The method of claim 9 further comprising:

generating a completed call record for billing a party associated with the destination phone using the call processor.

13. The method of claim 9 further comprising:

retrieving the stored response using a facility phone through the call processor.

14. The method of claim 13 wherein:

the stored response is retrieved more than one time.

15. The method of claim 9 further comprising:

generating a call data record for the message and the response for billing a party associated with the destination phone using the call processor.

16. The method of claim 9 further comprising:

recording the message irrespective of the first collect call from the facility phone to the destination phone.

17. A system comprising:

a call processor operable for enabling collect calls from facility phones to destination phones when the collect calls are accepted at the destination phones, terminating the collect calls when the collect calls are rejected at the destination phones, and recording messages from the facility phones for the destination phones; and a message delivery module coupled to the call processor to be operable for automatically calling the destination phones as collect calls, delivering the messages to the destination phones and recording responses to the messages when the collect calls are accepted at the destination phones, and storing the responses for subsequent retrieval by the facility phones;

wherein the call processor records a message from a facility phone for a destination phone in response to a first collect call from the facility phone to the destination phone being terminated;

wherein the message delivery module automatically calls the destination phone as a second collect call in response to the message having been recorded, wherein upon the second collect call being accepted at the destination phone the message delivery module delivers the message to the destination phone during the second collect call, records a response to the message from the destination phone during the second collect call after the message has been delivered, and stores the response for subsequent retrieval by a facility phone.

18. The system of claim 17 wherein:

the message delivery module delivers the response to a facility phone upon the facility phone calling the message delivery module.

\* \* \* \* \*